(No Model.)

G. W. WALKER.
ELECTRICAL MEASURING INSTRUMENT.

No. 435,550. Patented Sept. 2, 1890.

Witnesses
Geo. W. Breck
Henry W. Lloyd.

Inventor
George W. Walker
By his Attorney
Jacob Felbel.

UNITED STATES PATENT OFFICE.

GEORGE WASHINGTON WALKER, OF NEW YORK, N. Y., ASSIGNOR TO THE WALKER ELECTRIC COMPANY, OF SAME PLACE.

ELECTRICAL MEASURING-INSTRUMENT.

SPECIFICATION forming part of Letters Patent No. 435,550, dated September 2, 1890.

Application filed May 15, 1890. Serial No. 351,909. (No model.)

*To all whom it may concern:*

Be it known that I, GEORGE WASHINGTON WALKER, a citizen of the United States, and a resident of New York city, in the county of New York and State of New York, have invented certain new and useful Improvements in Electrical Measuring-Instruments, of which the following is a specification.

My improvements in electrical measuring-instruments relate more particularly to the means for moving or vibrating the needle or other indicating portion thereof, and has for its main object to provide a construction whereby the deflections or movements of the indicating device may be proportional, or substantially so, to the strength of the electric current employed, in order that an equally-divided or graduated scale may be employed and in order that uniform deflections and readings may be obtained.

To this end and object my invention consists in the various features of construction and combinations of devices hereinafter more fully described, and particularly pointed out in the appended claims.

Figure 2:
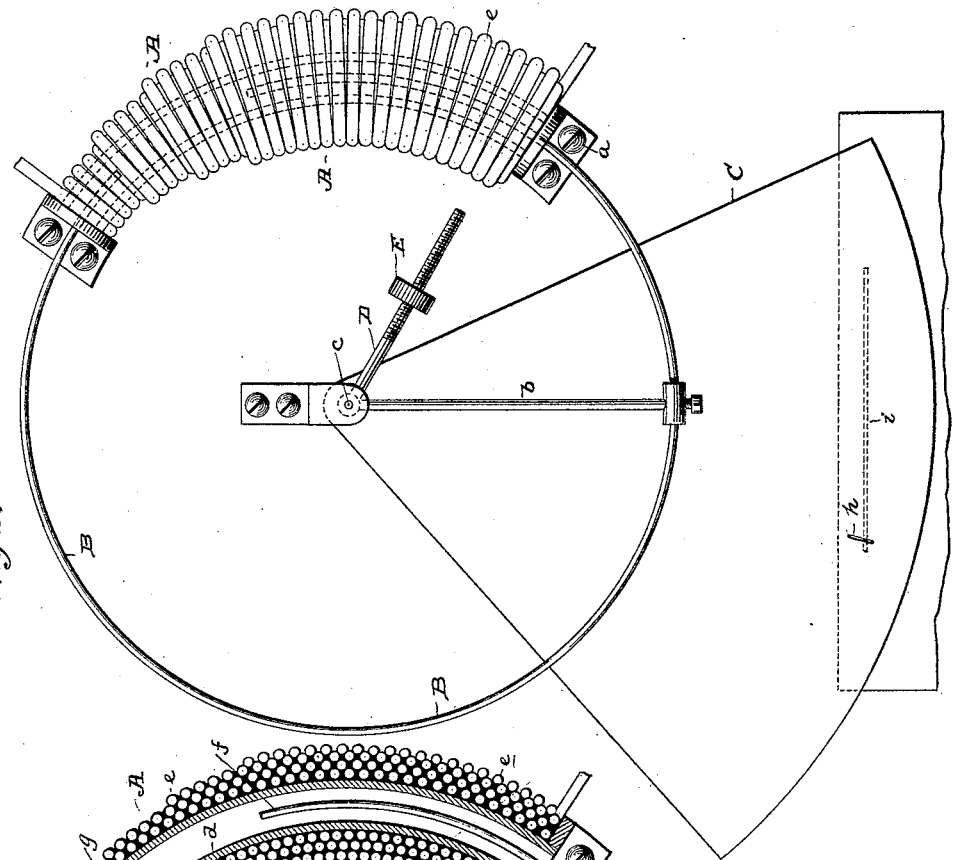
Figure 1:
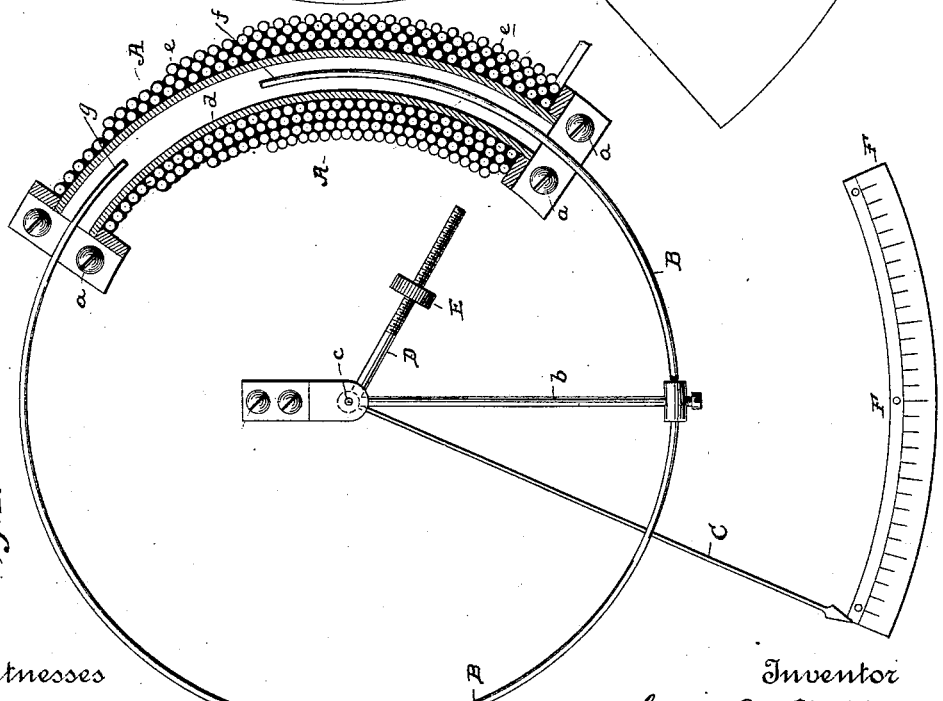

In the accompanying drawings, Figure 1 is a front elevation, partly in section, of a meter embodying my improvements. Fig. 2 is also a front elevation embodying a modification of my invention.

In the several views the same part will be found designated by the same letter of reference.

A represents a solenoid-magnet, of arc shape, secured in position upon or against a suitable support by means of screws $a$.

B designates a circular core or armature provided with a radius-bar $b$, pivoted at $c$ centrally of the core and serving as the axis of motion of the core.

C represents a needle or indicating means secured at one end at the axis $c$ and extending outward beyond the core. D designates an arm, also secured at the axis $c$ and threaded to receive a nut-like weight E, by means of which the core may be balanced or adjusted to have the free end of the device C stand normally at the desired position—for instance, at the zero or starting point of an ampère, scale F.

The solenoid A is composed, essentially, of the curved non-magnetic tube $d$ and helix of insulated wire $e$, which is wound in a right-handed direction about said tube, and is included in the circuit whose current is to be measured or indicated. The wire is so wound or arranged upon the the tube or support as that the coil or helix tapers or decreases in diameter from one end to the other, preferably in steps, as shown.

The core is made of wire of comparatively small diameter and of iron, preferably slightly harder than soft iron. It may, however, be made of soft iron or of steel. The ends $f$ and $g$ of the core are preferably both arranged to stand within the coil during the normal condition of the apparatus. The end $g$ may, however, be arranged to stand without the coil, yet within the field of repulsion of the magnet. The end $f$ preferably stands within the coil for about one-half its length. The scale F is arc-shaped and equally divided or graduated. In the normal condition the index or pointer rests at the extreme left or at zero. During the passage of the current through the coil the core is acted upon by the magnetism developed, and is oscillated and the pointer vibrated along the scale to indicate the quantity or strength of the current employed. Owing to the variable or tape winding of the coil, the magnetism produced therein decreases in the direction of the movement of the core, and the core is influenced directly as the strength of the current increases, moving equal distances in the coil for each additional ampère of current or fraction thereof and moving the index or pointer correspondingly, thus making it possible to employ an equally-divided scale. Immediately the current is caused to pass through the coil the end $f$ is attracted and drawn into the coil, more or less, according to the strength of the current, and the end $g$ is repelled or drawn out or partially out of the coil. By using a core of small diameter it may be saturated by a slight percentage of the current used in the meter. By using a small iron core, which is harder than soft iron, it may retain a small amount of residual magnetism, which is of advantage.

Instead of having the end $g$ of the core arranged normally within the coil, it may be located exteriorly thereof but I prefer to have it near enough thereto to be within the repellent influence of the magnet.

In lieu of having the ends $f$ and $g$ of the core wholly disconnected, as shown, they may be united to complete the ring by a piece of brass of other non-magnetic substance, or the core may be made of brass faced or provided with a strip of iron or steel.

The variable winding of the magnet is governed somewhat of course by the weight E, which increases in power as the core and needle advance, and which acts upon the same in a direction contrary to that in which said devices move under the attractive influence of the magnet.

The indicating device C may be made of plate-like form, as shown at Fig. 2, perforated, as at $h$, to pass over a slot $i$, as shown in the Letters Patent No. 406,678, granted to me July 9, 1889, whereby the deflections or movements of said device may be photographed, as set forth in said patent. The scale F may be omitted in this construction. The indicating device, like that shown at Fig. 1, is adapted to move equal distances for each unit of current, and hence uniform readings of the photographic record may be obtained.

What I claim as new, and desire to secure by Letters Patent, is—

1. The combination of a curved solenoid-magnet having its coil tapering or of varying diameter, a curved or circular pivoted core, and a needle or indicator.

2. The combination of a curved solenoid-magnet having its coil tapering or of varying diameter, a curved or circular pivoted core, a needle or indicator, and a counter-weight.

3. The combination of a curved solenoid-magnet having its coil tapering or of varying diameter, a curved or circular pivoted core, a needle or indicator, a counter-weight, and a scale provided with equal divisions.

4. The combination of a curved solenoid-magnet having its coil tapering or of varying diameter, a curved or circular pivoted core of small diameter, and a needle or indicator.

5. The combination of a curved solenoid magnet having its coil tapering or of varying diameter, a curved or circular pivoted core of small diameter and of a degree of hardness greater than that of soft iron, and a needle or pointer.

6. The combination of a curved solenoid-magnet having its coil tapering or of varying diameter, a curved or circular pivoted core of small diameter, a needle or indicator, a counter-weight, and an equally-divided scale.

7. The combination of a curved solenoid-magnet having its coil tapering or of varying diameter, a needle or indicator, and a curved or circular pivoted core having one end well inclosed within the coil to be within its attractive influence and the other end also inclosed within the coil or near enough thereto to be within its repellent influence.

Signed at New York city, in the county of New York and State of New York, this 6th day of May, A. D. 1890.

GEORGE WASHINGTON WALKER.

Witnesses:
ASA H. PAINE,
EDWIN C. WILLCOX.